July 21, 1964  N. E. WHITNEY  3,141,301
ROCKET INJECTOR HEAD
Filed April 12, 1960
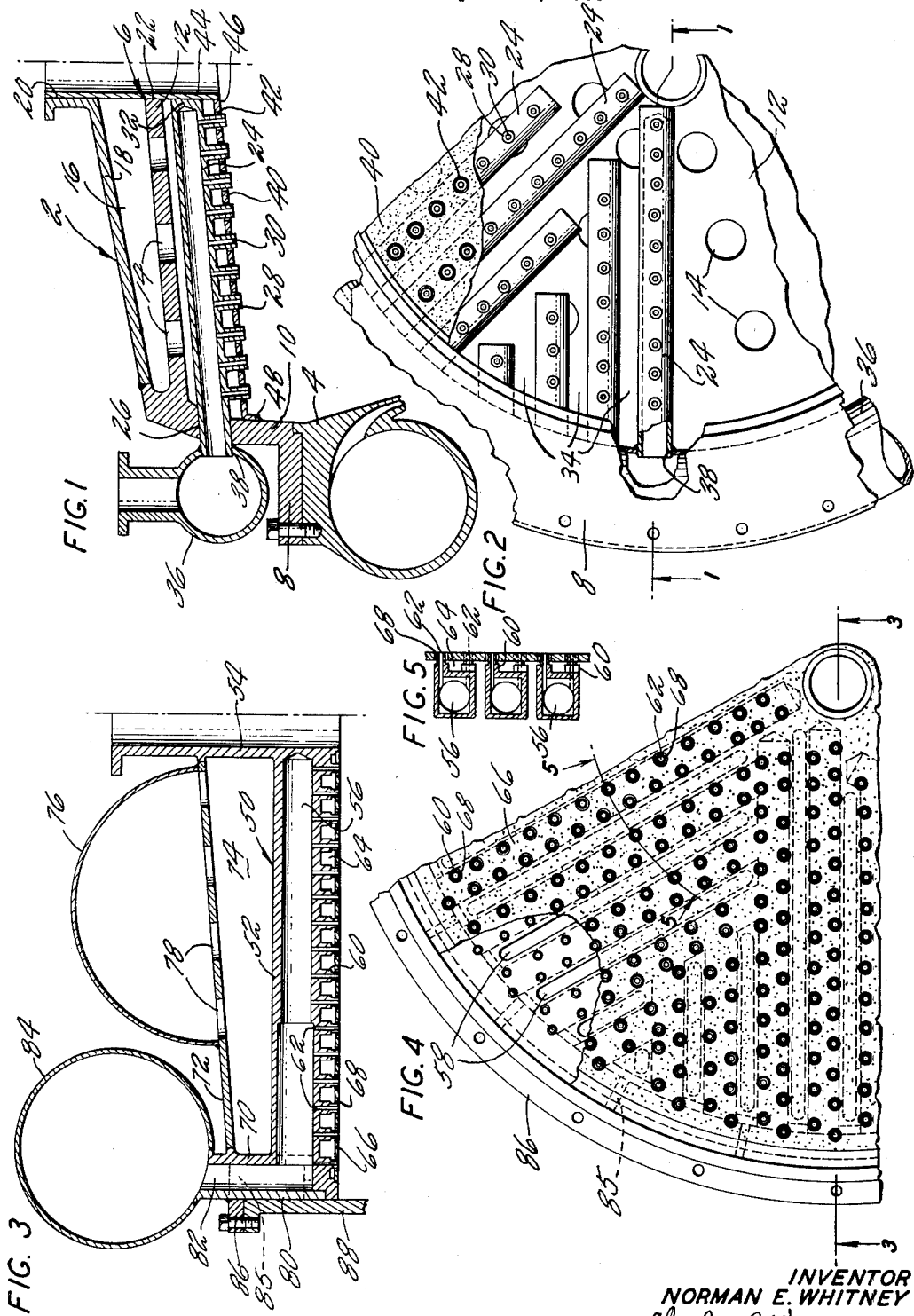
INVENTOR
NORMAN E. WHITNEY
BY Charles A. Warren
ATTORNEY

United States Patent Office 3,141,301
Patented July 21, 1964

3,141,301
ROCKET INJECTOR HEAD
Norman E. Whitney, Windsor Locks, Conn., assignor to United Aircraft Corporation, East Hartford, Conn., a corporation of Delaware
Filed Apr. 12, 1960, Ser. No. 21,834
4 Claims. (Cl. 60—39.46)

This invention relates to an injector head for a rocket.

The injector head serves to introduce two propellants, an oxidizer and a fuel, in large quantities and in a way to insure adequate mixing. As rocket powers have increased, the pressure in the rocket chamber has increased and the injector head must be a strong structural member in order to withstand the loading thereon. One feature of the invention is an injector head having the necessary structural strength and also incorporating the desirable characteristics of high volume flow and good mixing. Another feature is an injector head incorporating these features and which has no brazed or welded connections by which either propellant can leak into the manifold for the other propellant.

One feature of the invention is the formation of a basic structural member as one of the propellant manifolds with this member slotted or ported for the flow of the other propellant through the basic member. The basic structural means is a single base member which may be forged for adequate strength, the member then being machined to the required form and dimension.

Other features and advantages will be apparent from the specification and claims, and from the accompanying drawings which illustrate an embodiment of the invention.

FIG. 1 is a longitudinal sectional view through an injector head, the section being substantially along the line 1—1 of FIG. 2.

FIG. 2 is a plan view with parts broken away of a portion of the injector head.

FIG. 3 is a view similar to FIG. 1 showing a modification, this view being substantially along the line 3—3 of FIG. 4.

FIG. 4 is a plan view with parts broken away of the modification of FIG. 3.

FIG. 5 is a fragmentary sectional view substantially along the line 5—5 of FIG. 4.

Referring first to FIG. 1, the injector head 2 is adapted to be mounted on the end of the side wall 4 of the rocket and may be bolted, as shown, or welded to form a unitary structure. The injector head consists of a structurally rugged base member 6 having the peripheral flange 8 by which it is attached to the side wall 4 and having a substantially cylindrical portion 10 connecting the flange 8 to the central portion 12 of the member. The portion 10 has a plurality of large ports 14 therein for the flow of fuel from a chamber 16 formed on the upper side of the portion 12 by a cover plate 18 attached as by welding to the cylindrical portion 10. The cover plate 18 and the base plate 6 may have aligned central openings 20 and 22 to receive an ignitor, if such is desired.

On the underside of the base member 6 are positioned a plurality of standpipes or tube-like elements 24 which extend in substantially the same radial plane inwardly through openings 26 in the cylindrical portion 10 and which carry a plurality of axially extending tubes 28. These tubes have passages 30 therein which communicate with the hollow standpipes, as shown, the inner end of each standpipe having an integral end closure 32. These elements are not necessarily all radial but may be positioned in the arrangement shown in FIG. 2. From this figure, it will be apparent that the elements or standpipes are arranged in groups and are of different lengths in the group. Adjacent standpipes are spaced apart in the plane of the pipes to provide passages 34 therebetween.

These standpipes also have clearance at their inner ends so that the several standpipes can be moved inwardly with respect to the cylindrical portion 10 in order that an annular oxidizer manifold 36 may be positioned around the cylindrical portion 10 of the base member. This manifold has a plurality of openings 38 and the standpipes, after the manifold is in position, are moved outwardly through the cylindrical portion 10 so that the outer ends of the standpipes fit within the openings 38 and are then brazed therein.

All the tubes or nozzles 28 extend longitudinally and a plate 40 is positioned over the ends of the tubes. The plate 40 has openings 42 therein to receive the tubes, each opening being larger than the tube to form an annular flow path or discharge nozzle for the fuel from chamber 16. This fuel passes through the openings 14 and around the standpipes so that it will discharge in a ring concentric to the discharge of oxidizer through the passages 30 in the tubes.

With this arrangement, it is apparent that the base member 6 provides a relatively strong element and is additionally strengthened by the cover plate 18 to provide a member capable of withstanding the pressure loading. The oxidizer standpipes are so arranged that the only place for leakage is where the standpipes fit within the openings 38 and such leakage will take place into the atmosphere. Similarly, any leakage from the fuel manifold or chamber which would occur at any brazed or welded joint will be into the atmosphere or into the combustion chamber of the rocket where it will not be confined to produce an explosion.

A sleeve 44 may be positioned in the openings 20 and 22 and in an aligned opening 46 in the plate 40 to form a closure for the fuel chamber, this sleeve being brazed at the several points of contact. The outer end of the plate 40 may have a bent-over flange 48 by which this plate is brazed to the inner surface of the cylindrical surface 10.

Referring now to FIGS. 3, 4 and 5, the injector head includes a relatively heavy base member 50 in the form of a disc 52 having a central projection 54 thereon. The projection 54 is hollow, as shown, to receive an ignitor, if desired. The disc 52 has a plurality of passages 56 machined therein, these passages being arranged in groups of parallel passages, as shown in FIG. 4, and the passages of any group are spaced apart so that the disc has slots 58 therethrough between adjacent passages 56. The passages 56 are all substantially in the same plane.

The underside of the disc 52 has a plurality of axially projecting tubes or nozzles 60 with passages 62 communicating with the large feeder passages 56. The tubes 60, which are parallel to one another, are machined out of the disc 52 to provide between the tubes interconnecting passages 64 by which the fuel may flow around the tubes. A plate 66 in substantial alignment with the ends of the tubes has openings 68 therein to fit around the tube ends and is secured to the base member. The openings 68 are larger than the tubes to provide an annular discharge passage surrounding and concentric to the tubes. The slots 58 form tube-like elements therebetween which have integral inner end closures, as shown.

Adjacent the outer periphery of the disc 52 is a longitudinally extending flange 70 to support the outer periphery of a cover plate 72 which extends inwardly to the center projection 54. The plate 72 is brazed in position in longitudinally spaced relation to the disc 52 to form a chamber 74 for one of the propellants. An annular manifold 76 brazed to the top side of the plate 72 delivers the propellant through large openings 78 in the plate 72. From the chamber 74 the propellants pass through the slots 58 into the intercommunicating passages 64 and thence through the openings in the plate 66.

A cylinder 80 is mounted on the disc 52 at its periphery in concentric radially-spaced relation to the flange 70 to define between the cylinder and the flange a passage or annular duct 82 for the other propellant. An annular manifold 84 which is brazed or welded to the upper ends of the ring 80 in the flange 70 supplied the passage 82 with propellant and this passage connects, as shown in FIG. 3, with the large size passages 56. The cylinder 80 may be held in spaced relation to the flange 70 by a plurality of radially extending spacers 85. The cylinder 80 may carry a projecting flange 86 by which the injector head may be fastened to the cylinder side wall 88 of the rocket.

With this arrangement, it will be clear that any leakage of either propellant at any of the brazed or welded points will take place into the atmosphere or into the combustion chamber so that there can be no leakage from either of the propellant chambers within the injector head into the chamber for the other propellant so that no explosive mixture of the propellants can occur within the injector head.

It is to be understood that the invention is not limited to the specific embodiment herein illustrated and described, but may be used in other ways without departure from its spirit as defined by the following claims.

I claim:

1. An injector head for a rocket engine including a base plate having a plurality of propellant passages therein in a radial plane, said passages being spaced apart and said plate having slots therethrough between the propellant passages, a cover plate on one side and spaced from said base plate to form a propellant chamber, projecting nozzles on said base plate on the side opposite to said cover plate and communicating with said propellant passages and a second plate mounted on the base plate in spaced relation thereto and substantially in alignment with the ends of the nozzles, said second plate having openings therein to receive the nozzles.

2. An injector head as in claim 1 in which an annular propellant manifold communicates with the outer ends of the propellant passages in the base plate and is mounted on said base plate.

3. An injector head as in claim 2 in which the base plate carries a peripheral annular flanges and a second annular flange is mounted on the base plate in spaced relation to the first flange to define an annular passage communicating with the propellant passages in the base plate.

4. An injector head as in claim 3 in which an annular manifold is attached to the annular flanges to communicate with the passage between said flanges.

References Cited in the file of this patent

UNITED STATES PATENTS

| | | |
|---|---|---|
| 2,551,538 | Hensel | May 1, 1951 |
| 2,703,962 | Olson | Mar. 15, 1955 |
| 2,741,085 | Prentiss | Apr. 10, 1956 |